United States Patent
Liu et al.

(10) Patent No.: US 12,328,767 B2
(45) Date of Patent: Jun. 10, 2025

(54) METHOD AND APPARATUS FOR PRACH REPETITIONS

(71) Applicant: Lenovo (Beijing) Ltd., Beijing (CN)

(72) Inventors: Hongmei Liu, Changping District (CN); Zhi Yan, Xicheng District (CN); Yingying Li, Haidian District (CN); Yuantao Zhang, Dongcheng District (CN); Haipeng Lei, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 486 days.

(21) Appl. No.: 17/774,623

(22) PCT Filed: Nov. 8, 2019

(86) PCT No.: PCT/CN2019/116694
§ 371 (c)(1),
(2) Date: May 5, 2022

(87) PCT Pub. No.: WO2021/087978
PCT Pub. Date: May 14, 2021

(65) Prior Publication Data
US 2022/0408491 A1    Dec. 22, 2022

(51) Int. Cl.
*H04W 74/0833* (2024.01)
*H04L 5/00* (2006.01)
*H04W 74/00* (2009.01)

(52) U.S. Cl.
CPC ....... *H04W 74/0833* (2013.01); *H04L 5/0048* (2013.01)

(58) Field of Classification Search
CPC ............. H04L 5/0049; H04L 5/0091; H04W 74/0833; H04W 74/002
See application file for complete search history.

(56) References Cited

U.S. PATENT DOCUMENTS 11,968,713 B2 *  4/2024  Xiong ................. H04W 52/146
2016/0262109 A1  9/2016  Chen et al.
(Continued)

FOREIGN PATENT DOCUMENTS

| CN | 108419300 A | 8/2018 |
|---|---|---|
| CN | 109041250 A | 12/2018 |

(Continued)

OTHER PUBLICATIONS 19951345.8, "Extended European Search Report", EP Application No. 19951345.8, Jul. 10, 2023, 12 pages.
(Continued)

*Primary Examiner* — Jenee Holland
(74) *Attorney, Agent, or Firm* — FIG. 1 Patents

(57) ABSTRACT

Embodiments of the present application are related to a method and apparatus for physical random access channel (PRACH) repetitions. A method according to an embodiment of the present application includes: receiving signaling information for indicating a synchronization signal block (SSB) group size; mapping indices of a plurality of SSBs to a plurality of physical random access channel (PRACH) occasions for a number of PRACH repetitions, wherein the plurality of SSBs are divided into one or more SSB groups based on the indicated SSB group size; and determining a set of PRACH occasions corresponding to one of the indices of the plurality of SSBs from the plurality of PRACH occasions based on the mapping.

20 Claims, 11 Drawing Sheets

(56) References Cited

U.S. PATENT DOCUMENTS

| | | |
|---|---|---|
| 2018/0324865 A1 | 11/2018 | Hui et al. |
| 2019/0047228 A1 | 3/2019 | Liu et al. |
| 2019/0104498 A1 | 4/2019 | Jung et al. |
| 2019/0159261 A1 | 5/2019 | Jung et al. |
| 2019/0208550 A1* | 7/2019 | Ko .................... H04W 72/0446 |
| 2020/0275479 A1* | 8/2020 | Peisa .................... H04W 74/04 |
| 2020/0396744 A1* | 12/2020 | Xiong .................... H04B 7/088 |
| 2021/0014804 A1 | 1/2021 | Huang et al. |
| 2021/0051672 A1* | 2/2021 | Rastegardoost .... H04W 74/006 |
| 2021/0051736 A1* | 2/2021 | Jeon .................... H04W 76/11 |
| 2021/0058971 A1* | 2/2021 | MolavianJazi ...... H04B 17/318 |
| 2021/0068165 A1* | 3/2021 | Svedman .............. H04L 5/0091 |
| 2021/0136827 A1* | 5/2021 | Xiong ................ H04W 74/004 |
| 2021/0144742 A1* | 5/2021 | Jeon .................. H04W 74/0833 |
| 2021/0352697 A1* | 11/2021 | Irukulapati .......... H04B 7/0695 |
| 2022/0007414 A1* | 1/2022 | Kim ...................... H04W 56/00 |
| 2022/0039174 A1* | 2/2022 | Dai .................... H04W 74/0833 |
| 2022/0070930 A1* | 3/2022 | Xiong .............. H04W 74/0891 |
| 2022/0078856 A1* | 3/2022 | Jeon .................... H04L 1/1671 |
| 2022/0150982 A1* | 5/2022 | Lee .................. H04W 74/0866 |
| 2022/0217790 A1* | 7/2022 | Qiu .................. H04W 56/0045 |
| 2022/0240326 A1* | 7/2022 | Rune .................. H04W 56/001 |
| 2022/0264659 A1* | 8/2022 | Enbuske ........... H04W 74/0866 |
| 2022/0279573 A1* | 9/2022 | Agiwal ............. H04W 74/0833 |
| 2022/0408491 A1* | 12/2022 | Liu ....................... H04L 5/0091 |

FOREIGN PATENT DOCUMENTS

| | | |
|---|---|---|
| CN | 109041593 A | 12/2018 |
| CN | 109511156 A | 3/2019 |
| CN | 109729580 A | 5/2019 |
| CN | 109922534 A | 6/2019 |
| CN | 110034887 A1 | 7/2019 |
| CN | 110278615 | 9/2019 |
| EP | 3471497 A1 | 4/2019 |
| WO | 2019014907 A1 | 1/2019 |
| WO | 2019047228 A1 | 3/2019 |
| WO | 2019082152 A1 | 5/2019 |
| WO | 20190139407 A1 | 7/2019 |

OTHER PUBLICATIONS

Nokia , "Summary of Remaining Details on RACH Procedure", 3GPP TSG-RAN WG1#NR1801, R1-1801097, Vancouver, BC, Canada [retrieved Jul. 27, 2023]. Retrieved from the Internet <https://www.3gpp.org/ftp/TSG_RAN/WG1_RL1/TSGR1_AH/NR_AH_1801/Docs>., Jan. 2018, 45 Pages.

ZTE , "Remaining issues of msgA channel structure", 3GPP TSG RAN WG1 #98bis, R1-1910002, Chongqing, China [retrieved Jul. 31, 2023]. Retrieved from the Internet <https://www.3gpp.org/ftp/tsg_ran/WG1_RL1/TSGR1_98b/Docs>., Oct. 2019, 26 Pages.

"LS on Lte Ue feature list", 3GPP TSG RAN WG1 Meeting #94bis, R1-1810078, Chengdu, China, Oct. 2018, 3 pages.

Panasonic , "NR-U PRACH resource enhancement", 3GPP TSG RAN WG1 #96bis, R1-1904595, Xi'an, China [retrieved Jul. 7, 2022]. Retrieved from the Internet <https://www.3gpp.org/ftp/TSG_RAN/WG1_RL1/TSGR1_96b/Docs/>., Apr. 2019, 4 pages.

PCT/CN2019/116694 , "International Preliminary Report on Patentability", PCT Application No. PCT/CN2019/116694, May 19, 2022, 6 pages.

PCT/CN2019/116694 , "International Search Report and Written Opinion", PCT Application No. PCT/CN2019/116694, Aug. 14, 2020, 8 pages.

Samsung , "Enhancements to Initial Access Procedure for NR-U", 3GPP TSG RAN WG1 Meeting #97, R1-1906921, Reno, USA [retrieved Jul. 7 2022]. Retrieved from the Internet <https://www.3gpp.org/ftp/tsg_ran/WG1_RL1/TSGR1_97/Docs>., May 2019, 15 pages.

ZTE , et al., "Remaining details of RACH procedure", 3GPP TSG RAN WG1 Meeting #92bis, R1-1803610, Sanya, China [retrieved Jun. 23, 2022]. Retrieved from the Internet <https://www.3gpp.org/ftp/tsg_ran/WG1_RL1/TSGR1_92b/Docs>, Apr. 2018, 18 pages.

19951345.8 , "Foreign Office Action", EP Application 19951345.8, May 6, 2024, 7 pages.

201980102027.2 , "Foreign Office Action", CN Application 201980102027.2, May 14, 2024, 10 pages.

3GPP , "Technical Specification Group Radio Access Network; NR; Physical layer procedures for control", 3GPP TS 38.213 V15.7.0, 3rd Generation Partnership Project; (Release 15), Sep. 2019, 108 pages.

\* cited by examiner

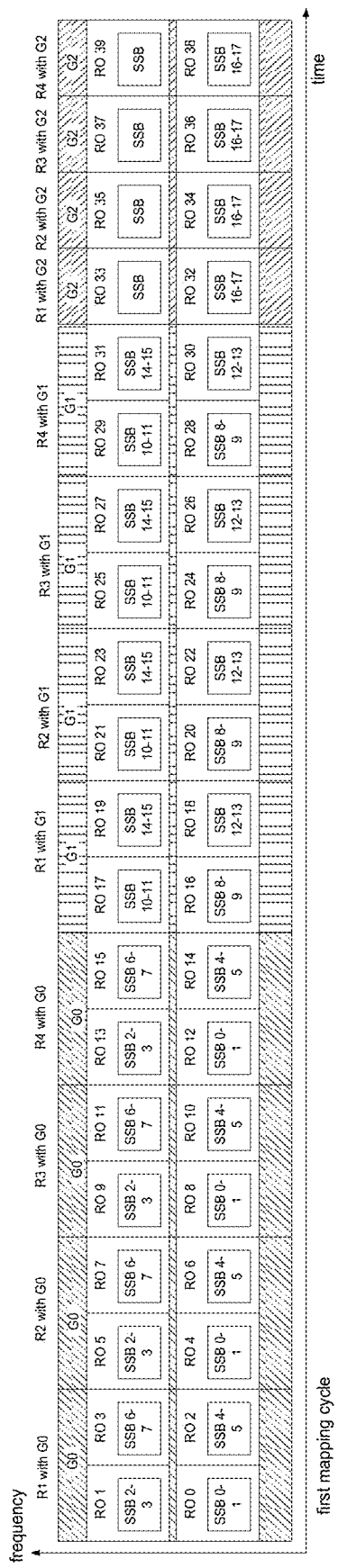
FIG. 9A (9A-1)
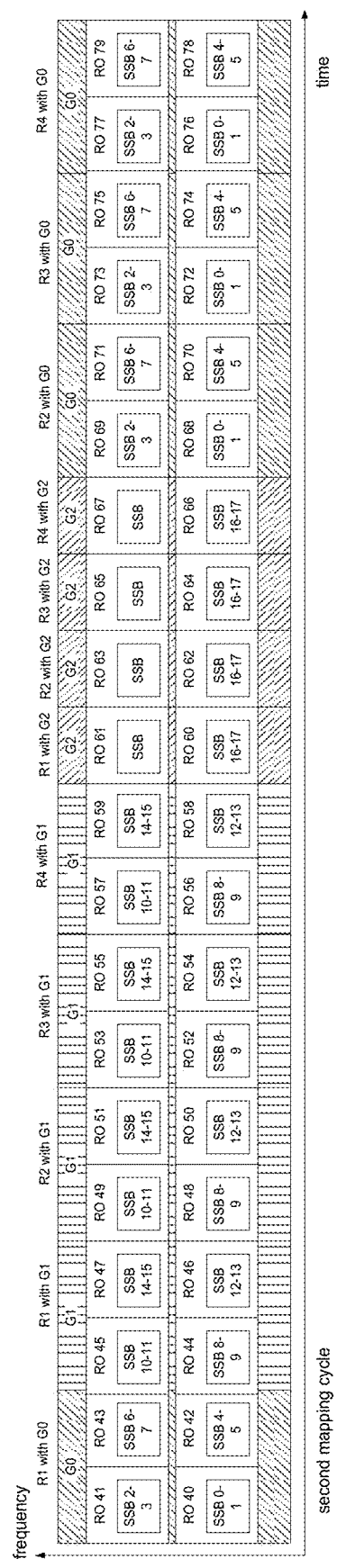
FIG. 9A (9A-2)

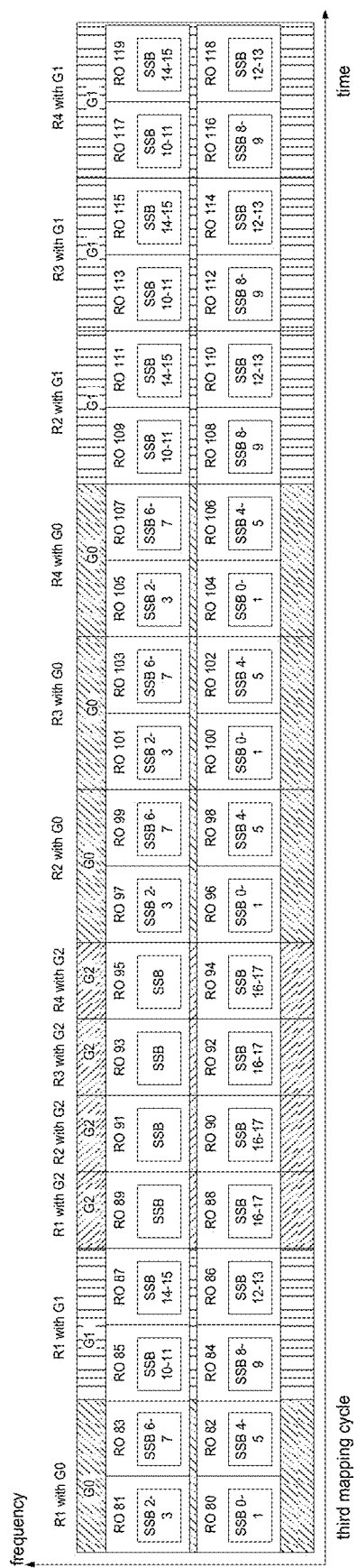
FIG. 9A (9A-3)

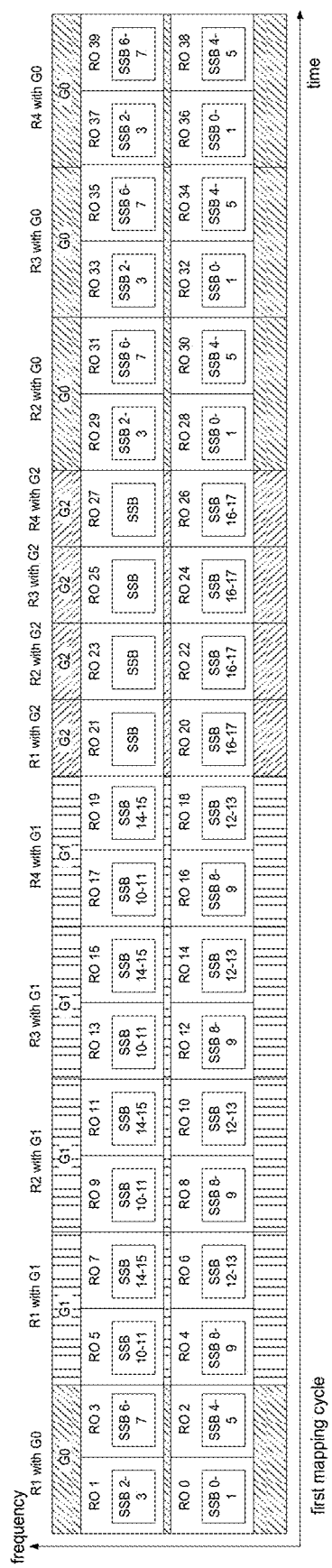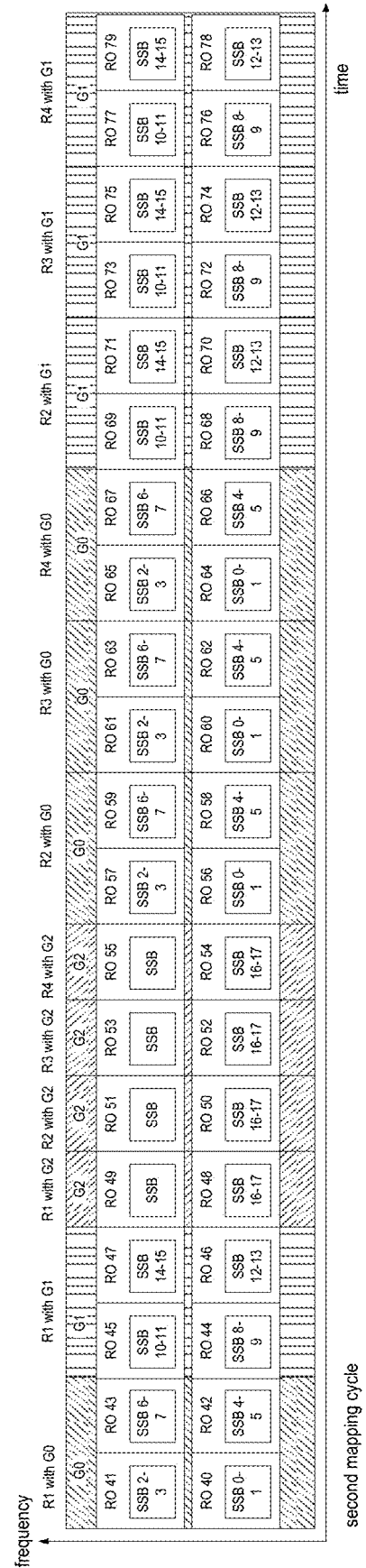
FIG. 9B (9B-1)
FIG. 9B (9B-2)

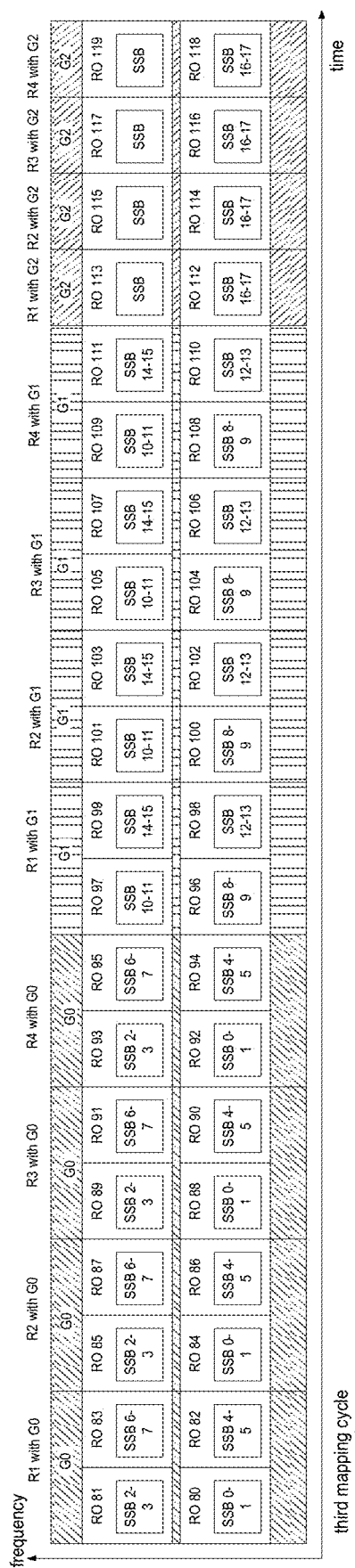
FIG. 9B (9B-3)

METHOD AND APPARATUS FOR PRACH REPETITIONS

TECHNICAL FIELD

Embodiments of the present application generally relate to wireless communication technology, especially to a method and an apparatus for physical random access channel (PRACH) repetitions.

BACKGROUND

In new radio (NR) light, due to the restrictions of uplink transmitting (Tx) antenna number and uplink transmission power, PRACH repetition in time domain, i.e., repeating the PRACH transmission for the same PRACH preamble in time domain is necessary to achieve the same uplink coverage as legacy technology, e.g., NR R15.

However, to achieve the PRACH repetition, several problems have to be solved. For example, in the case of mapping synchronization signal blocks (SSBs) to PRACH occasions for PRACH repetition, when there are more than one time domain PRACH occasions mapped to the SSBs in a mapping cycle, whether to go through SSBs in order of indices first or to repeat PRACH transmissions first should be determined, so that both the network side and UE side have the same understanding of the mapping. Meanwhile, without any enhancement, the PRACH repetitions for a specific SSB will disperse in time domain, which will cause quite long time for random access. In addition, the maximum number of PRACH repetitions supported by PRACH occasions in time domain, and the coexistence with legacy technology etc. should also be considered.

Thus, there is a need for further complementing and improving the technical solutions for PRACH repetition, e.g., mapping between SSBs and PRACH occasions.

SUMMARY

One object of the embodiments of the present application is to provide technical solutions for PRACH repetitions, especially, a mapping mechanism between SSBs and PRACH occasions for PRACH repetitions.

Some embodiments of the present application provide a method, including: receiving signaling information for indicating a synchronization signal block (SSB) group size; mapping indices of a plurality of SSBs to a plurality of physical random access channel (PRACH) occasions for a number of PRACH repetitions, wherein the plurality of SSBs are divided into one or more SSB groups based on the indicated SSB group size; and determining a set of PRACH occasions corresponding to one of the indices of the plurality of SSBs from the plurality of PRACH occasions based on the mapping.

Some other embodiments of the present application provide a method, including: transmitting signaling information for indicating a synchronization signal block (SSB) group size; mapping indices of a plurality of SSBs to a plurality of physical random access channel (PRACH) occasions for a number of PRACH repetitions, wherein the plurality of SSBs are divided into one or more SSB groups based on the SSB group size; and responding to a PRACH preamble transmitted on a number of PRACH occasions corresponding to one of the indices of the plurality of SSBs based on the mapping.

Some other embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement any of the abovementioned method.

Embodiments of the present application propose technical solutions for PRACH repetitions, especially for the mapping between SSBs and PRACH occasions for PRACH repetitions. Meanwhile, embodiments of the present application consider the coexistence with legacy technology. Thus, embodiments of the present application will great facilitate the implementation of 5G NR including NR light.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 9A illustrates an exemplary mapping between SSBs and PRACH occasions under the mechanism of PRACH repetition starting position cycling according to some embodiments of the present application, which further includes FIG. 9A-1 corresponding to the first mapping cycle, FIG. 9A-2 corresponding to the second mapping cycle, and FIG. 9A-3 corresponding to the third mapping cycle;

FIG. 9B illustrates an exemplary mapping between SSBs and PRACH occasions under the mechanism of PRACH repetition starting position cycling according to some other embodiments of the present application, which further includes FIG. 9B-1 corresponding to the first mapping cycle, FIG. 9B-2 corresponding to the second mapping cycle, and FIG. 9B-3 corresponding to the third mapping cycle.

DETAILED DESCRIPTION

Figure 1:
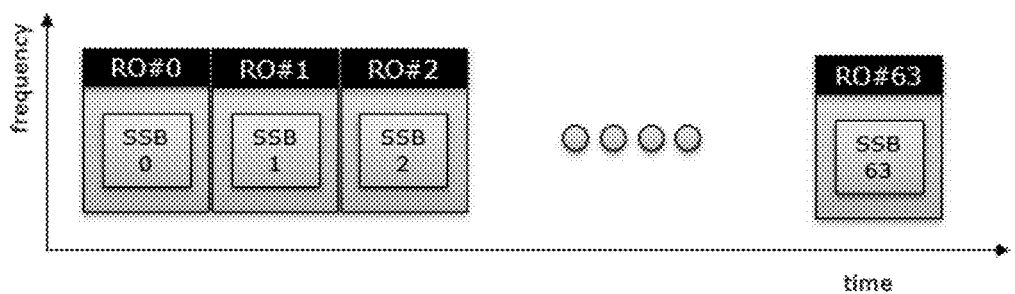
FIGS. 1-4 illustrate exemplary embodiments of mapping between SSBs and PRACH occasions depending on the specific setting of "msg1-FDM" and "ssb-perRACH-OccasionAndCBPreamblesPerSSB"

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

PRACH develops from random access channel (RACH), which has very important functionality especially in NR and long term evolution (LTE) (and in wideband code division multiple access (WCDMA) as well). The main purpose of PRACH/RACH can be described as: I) achieving uplink synchronization between user equipment (UE), e.g., a mobile phone and base station (BS), e.g., an eNB; and ii) obtaining the resource for Message 3 (Msg3). There are several different types of Msg3 depending on situations, e.g., Radio Resource Control (RRC) Connection Request.

In an exemplary scenario, when a UE is turned on, the UE will transmit a PRACH signal to the network side e.g., a BS. The PRACH signal is also called "PRACH preamble" (preamble). PRACH occasion (RO) is an area specified in time and frequency domain that are available for the transmission of PRACH preamble, and time domain PRACH occasion is the smallest time domain resource unit for a PRACH preamble transmission. In LTE, all the possible PRACH preambles share the same PRACH occasion specified by RRC message (e.g., SIB2), but in NR story gets more complicated. In NR, different SSBs are associated with different beams and a UE can select a certain beam (downlink spatial domain filter) and send a PRACH preamble on a PRACH occasion using that beam. NR R15 has defined a specific mapping relationship between SSBs (or SSB indices for identifying the SSBs) and PRACH occasions, so that the network side can figure out which SSB or beam that the UE has selected by detecting which RO the UE sent the PRACH preamble on. In other words, a PRACH occasion is associated with an SSB or SSB index to implicitly indicate the selected beam for downlink transmission and if applied, as well as uplink transmission.

Specifically, the mapping between SSBs and PRACH occasions can be defined by two RRC parameters defined in TS 38.331 f60, i.e., "msg1-FDM" and "ssb-perRACH-OccasionAndCB-PreamblesPerSSB," wherein although the parameter "ssb-perRACH-OccasionAndCB-PreamblesPerSSB" is expressed in a single manner, it can express two sub-parameter values simultaneously, i.e., the value of "ssb-perRACH-Occasion" and the value of "CB-PreamblesPerSSB." According to TS 38.331 f60, "msg1-FDM" describes the number of PRACH transmission occasions FDMed in one time instance, that is, "msg1-FDM" specifies how many ROes are allocated in frequency domain (at the same location in time domain); "ssb-perRACH-Occasion" describes the number of SSBs per RACH occasion (time and frequency), and "CB-PreamblesPerSSB" describes the number of contention-based PRACH preambles per SSB, that is, "ssb-perRACH-OccasionAndCB-PreamblesPerSSB" specifies how many SSBs can be mapped to one RO and how many PRACH preambles can be mapped to a single SSB.

TS 38.213 f60 also describes the overall mapping logic as follows.
- First, in increasing order of preamble indices within a single PRACH occasion
- Second, in increasing order of frequency resource indices for frequency multiplexed PRACH occasions
- Third, in increasing order of time resource indices for time multiplexed PRACH occasions within a PRACH slot
- Fourth, in increasing order of indices for PRACH slots Mapping between SSBs and PRACH occasions is periodically performed. Depending on the specific setting of the two parameters "msg1-FDM" and "ssb-perRACH-OccasionAndCBPreamblesPerSSB," the number of time domain PRACH occasions for all the available SSBs in a mapping cycle can be one or more. According to NR R15, the total number of available SSBs is 64. That is, there are 64 available SSBs indexed from 0 to 63, i.e., SSB 0-SSB 63. In each mapping cycle, PRACH occasions, which are also called "valid PRACH occasions" will be mapped to the 64 available SSBs. In the future, the total number of available SSBs may change, which will not affect the principle of the present application.

FIGS. 1-4 illustrate exemplary embodiments of mapping between SSBs and PRACH occasions depending on the specific setting of "msg1-FDM" and "ssb-perRACH-OccasionAndCBPreamblesPerSSB."

Specifically, in the embodiment shown in FIG. 1, both "msg1-FDM" and "ssb-perRACH-OccasionAndCBPreamblesPerSSB" are set as "1." That is, only one RO is allocated in frequency domain at the same location in time domain, and only one SSB (or SSB index) can be mapped to one RO. For example, RO #0, RO #1, RO #2 . . . RO #63 are respectively allocated in different locations in time domain, while in the same location in time domain, only one RO, e.g., RO #0, RO #1, RO #2 . . . or RO #63 is allocated in frequency domain. Only SSB 0 can be mapped to RO #0, only SSB 1 can be mapped to RO #1, only SSB 2 can be mapped to RO #2 . . . only SSB 63 can be mapped to RO #63.

Figure 2:
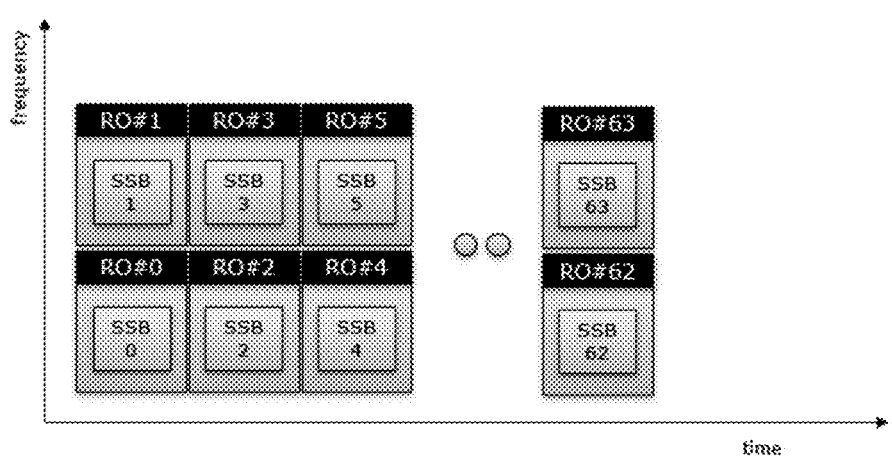

In the embodiment shown in FIG. 2, "msg1-FDM" is set as "2," while "ssb-perRACH-OccasionAndCBPreamblesPerSSB" is set as "1." That is, two ROes, are allocated at different locations in frequency domain while at the same location in time domain, and only one SSB (or SSB index) can be mapped to one RO. For example, RO #0 and RO #1 are allocated at different locations in frequency domain while at the same location in time domain, RO #2 and RO #3 are allocated in different locations in frequency domain while in the same location in time domain, which is similar to the following each two ROes, e.g., RO #4 and RO #5 . . . and RO #62 and RO #63. Only SSB 0 can be mapped to RO #0, and only SSB 1 can be mapped to RO #1, which is similar to the following SSBs, e.g., SSB 2, SSB 3, SSB 4, SSB 5 . . . SSB 62 and SSB 63.

Figure 3:
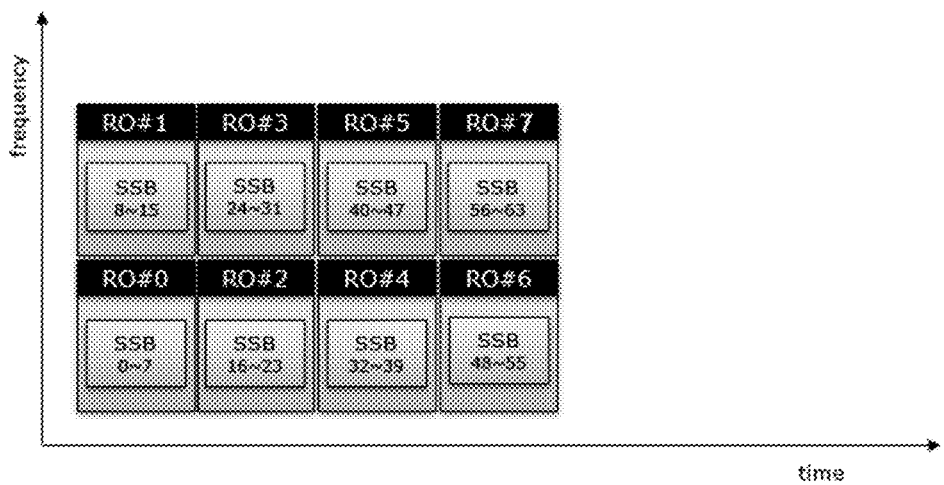

In the embodiment shown in FIG. 3, "msg1-FDM" is set as "2," while "ssb-perRACH-OccasionAndCBPreamblesPerSSB" is set as "8." That is, two ROes, are allocated at different locations in frequency domain while at the same location in time domain, and 8 SSBs (or SSB indices) can be mapped to one RO. For example, RO #0 and RO #1 are allocated at different locations in frequency domain while in the same location in time domain, RO #2 and RO #3 are allocated in different locations in frequency domain while in the same location in time domain, which is similar to the following each two ROes, e.g., RO #4 and RO #5, and RO #6 and RO #7. SSB 0-7 can be mapped to RO #0, SSB 8-15 can be mapped to RO #1, SSB 16-23 can be mapped to RO #2, SSB 24-31 can be mapped to RO #3, SSB 32-39 can be mapped to RO #4, SSB 40-47 can be mapped to RO #5, SSB 48-55 can be mapped to RO #6, and SSB 56-63 can be mapped to RO #7.

Figure 4:
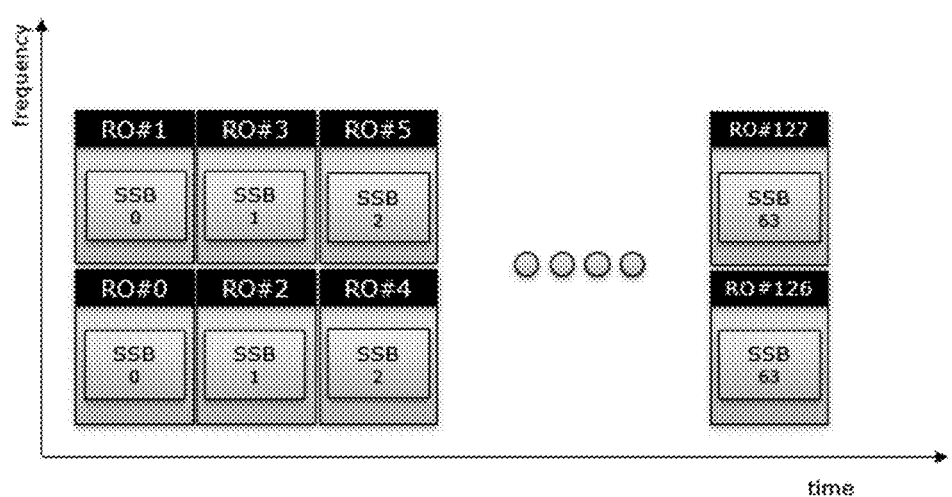

In the embodiment shown in FIG. 4, "msg1-FDM" is still set as "2," while "ssb-perRACH-OccasionAndCBPreamblesPerSSB" is set as "½." That is, two ROes, are allocated at different locations in frequency domain while at the same location in time domain, and one SSB (or SSB index) can be mapped to two ROes. Thus, for 64 SSBs, there are 128 ROes to be mapped. For example, RO #0 and RO #1 are allocated at different locations in frequency domain while at the same location in time domain, RO #2 and RO #3 are allocated at different locations in frequency domain while at the same location in time domain, which is similar to the following each two ROes, e.g., RO #4 and RO #5 . . . RO #126 and RO #127. Each SSB can mapped to the two ROes in the same time domain, e.g., SSB 0 can be mapped to RO #0 and RO #1, SSB 1 can be mapped to RO #2 and RO #3, SSB 2 can be mapped to RO #4 and RO #5 . . . SSB 63 can be mapped to RO #126 and RO #127.

Considering the restrictions of uplink transmitting (Tx) antenna number and uplink transmission power, PRACH repetition i.e., repeating the PRACH transmission for the same PRACH preamble is introduced in NR light based on legacy technology, e.g., NR R15 to achieve the same uplink coverage as the legacy technology.

According to some embodiments of the present application, for a number of PRACH repetitions, a plurality of SSBs can be configured or predefined and be divided into one or more SSB groups. The number of PRACH repetitions means the PRACH transmission associated with the same PRACH preamble is repeated one or more times. The amount of the plurality of SSBs can be the same as or less than that of the total available SSBs in NR R15, i.e., 64 SSBs. The mapping between SSBs (or indices of SSBs, hereafter, the same) and PRACH occasions (or valid PRACH occasions, hereafter, the same) are performed based on SSB groups. Meanwhile, the mapping is periodically performed, and each mapping cycle is associated with the number of PRACH repetitions. Each mapping cycle can start from a configured or predefined time domain position, e.g. frame 0. For the number of PRACH repetitions, the duration of each mapping cycle is a smallest value that all the indices of the plurality of SSBs can be mapped to a plurality of PRACH occasions for the number of PRACH repetitions. During each mapping cycle, the overall mapping logic specified in TS 38.213 f60 is also adaptive. The amount of the plurality of PRACH occasions depends on the amount of PRACH occasions in each SSB group, the amount of the SSB groups, and the times of the number of PRACH repetitions.

Generally, mapping the indices of the plurality of SSBs to the plurality of PRACH occasions is performed in the following order:
   first, in increasing order of SSB indices within an SSB group;
   then, in increasing order of PRACH repetition indices; and
   then, in increasing order of SSB group indices.

In addition, regarding how to index the time domain, frequency domain, and code domain PRACH resources, the overall mapping logic in TS 38.331 f60 is also adaptive, that is,
   First, in increasing order of preamble indices within a single PRACH occasion
   Second, in increasing order of frequency resource indices for frequency multiplexed PRACH occasions
   Third, in increasing order of time resource indices for time multiplexed PRACH occasions within a PRACH slot
   Fourth, in increasing order of indices for PRACH slots To obtain a complete mapping pattern between the plurality of SSBs and the plurality of PRACH occasions, more mapping parameters are needed besides the above. More specific embodiments on the mapping between SSBs and the PRACH occasions will be illustrated in the following texts.

According to some embodiments of the present application, the SSB group size for dividing the plurality of SSBs into one or more SSB group, i.e., "SSB-group-size" means how many SSBs can be contained at most within a SSB group, which can also be configured or predefined. The times of the number of PRACH repetitions, i.e., "PRACH-repetition-times" means how many times the PRACH transmission for the same PRACH preamble are repeated, which can also be configured or predefined. Moreover, besides the overall mapping logic in TS 38.331 f60, the two legacy RRC parameters defined in TS 38.331 f60, i.e., "msg1-FDM" and "ssb-perRACH-OccasionAndCB-PreamblesPerSSB" are also adaptive. Specifically, "msg1-FDM" describes the number of PRACH occasions FDMed in one time instance, that is, "msg1-FDM" specifies how many ROes are allocated in frequency domain (at the same location in time domain); "ssb-perRACH-Occasion" describes the number of SSBs per PRACH occasion (time and frequency), and "CB-PreamblesPerSSB" describes the number of contention-based PRACH preambles per SSB.

Based on the above mapping parameters, the mapping pattern between the plurality of SSBs and the plurality of PRACH occasions can be determined. Specifically, the amount of SSB groups, i.e., "SSB-group-amount" can be calculated as: SSB-group-amount=ceil (SSB-total/SSB-group-size). The amount of time domain PRACH occasions per SSB group, i.e., "time-RO-perSSBgroup" can be determined by: time-RO-perSSBgroup=ceil (SSB-group-size/(msg1-FDM*ssb-perRACH-Occasion)). The amount of PRACH occasions per SSB group, i.e., "RO-perSSBgroup" can be calculated as: RO-perSSBgroup=ceil (SSB-group-size/ssb-perRACH-Occasion). The amount of the plurality of PRACH occasions for mapping all the plurality of SSBs, i.e., RO-total is calculated as: RO-total=RO-perSSBgroup*PRACH-repetition-times*SSB-group-amount. The amount of time domain PRACH occasions among the plurality of PRACH occasions for mapping all the plurality of SSBs, i.e., time-RO-total is calculated as: time-RO-total=time-RO-perSSBgroup*PRACH-repetition-times*SSB-group-amount.

Accordingly, based on the determined mapping pattern, for example, SSB-total is ST, and SSB-group-size is k, that is, there are st/k SSB groups, e.g., G0 to G(st/k−1). "RO-perSSBgroup" is h, that is, there are h PRACH occasions at most per SSB group, and PRACH-repetition-times is x. Then, based on the above mapping order, i.e., first, in increasing order of SSB indices within an SSB group; then, in increasing order of PRACH repetition indices; and then, in increasing order of SSB group indices; the mapping will start from the first SSB group in a mapping cycle. Specifically, the mapping between SSBs and PRACH occasions for a number of PRACH repetitions x will start from G0 at a configured or predefined location in time domain, e.g. frame 0. The mapping within G0 will be associated with SSBs 0 to k−1, and will be repeated x times from PRACH occasion 0 to PRACH occasion (h*x−1). The mapping for G1 will start from PRACH occasion h*x, will be associated with SSBs k to 2k−1, and will be repeated x times from PRACH occasion h*x to PRACH occasion (h*2x−1). Then, the mapping for G3 to G(st/k−1) will be performed in the same way until all the ST SSBs are mapped.

Figure 5:
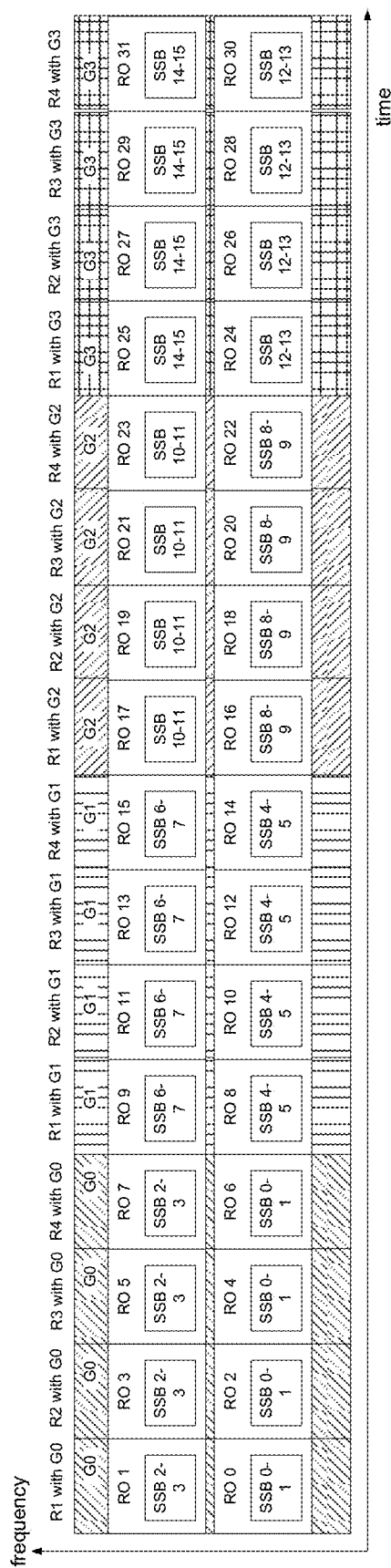
FIG. 5 illustrates an exemplary mapping between SSBs and PRACH occasions according to some embodiments of the present application.

FIG. 5 illustrates an exemplary mapping between SSBs and PRACH occasions according to some embodiments of the present application.

In the exemplary embodiment shown in FIG. 5, SSB group size, i.e., "SSB-group-size" is 4. The amount of a plurality of SSBs to be mapped, i.e., "SSB-Total" is 16. "msg1-FDM" is 2 and "SSBPerRACHOccasion" is 2. The times of PRACH repetitions, i.e., "PRACH-repetition-times" is 4, each corresponding to R1, R2, R3 and R4. Then, the amount of SSB groups, "SSB-group-amount" is: SSB-group-amount=ceil (SSB-total/SSB-group-size)=ceil(16/4) =4. That is, there are 4 SSB groups, e.g., G0, G1, G2, and G3. The amount of time domain PRACH occasions per SSB group, i.e., "time-RO-per-SSBgroup" is determined by: time-RO-per-SSBgroup=ceil (SSB-group-size/(msg1-FDM*ssb-perRACH-Occasion))=ceil (4/(2*2))=1. That is, for each repetition for one SSB group, there is one time domain PRACH occasion. For example, for the first repetition with G0, i.e., R1 with G0, there is time domain PRACH occasion associated with RO 0; for the second repetition with G1, i.e., R2 with G0 there is time domain PRACH occasion associated with RO 10; for the third repetition with G2, i.e., R3 with G2 there is time domain PRACH occasion associated with RO 20; and for the fourth repetition with G3, i.e., R4 with G3, there is time domain PRACH occasion associated with RO 30. The amount of PRACH occasions per SSB group, i.e., "RO-per-SSBgroup" is calculated as: RO-per-SSBgroup=ceil (SSB-group-size/ssb-perRACH-Occasion)=ceil (4/2)=2. That is, for each repetition for one SSB group, there are 2 PRACH occasions. For example, for the first repetition with G0, there are RO 0, and RO 1 in the time and frequency domain (not considering code domain) (also called "TRO 0," i.e., the first RO set in time and frequency domain); for the second repetition with G1, there are RO 10 and RO 11 in the time and frequency domain (not considering code domain) (also called "TRO 5," i.e., the sixth RO set in time and frequency domain); for the third repetition with G2, there are RO 20 and RO 21 in the time and frequency domain (not considering code domain) (also called "TRO 10," i.e., the eleventh RO set in time and frequency domain); and for the fourth repetition with G3, there are RO 30 and RO 31 in the time and frequency domain (not considering code domain) (also called "TRO 15," i.e., the sixth RO set in time and frequency domain). The amount of the plurality of PRACH occasions for all the plurality of SSBs is calculated as: RO-total-amount=RO-per-SSBgroup*PRACH-repetition-times*SSB-group-amount=2*4*4=32. That is, for 4 times PRACH repetition, there are totally 32 PRACH occasions for the mapping of 16 SSBs, i.e., RO 0 to RO 31. The amount of the plurality of time domain PRACH occasions for all the plurality of SSBs is calculated as: time-RO-total-amount=time-RO-per-SSBgroup*PRACH-repetition-times*SSB-group-amount=1*4*4=16. That is, for 4 times PRACH repetition, there are totally 16 time domain PRACH occasions for the mapping of 16 SSBs, i.e., TRO 0, TRO 1, TRO 2, ... TRO 15.

According to some embodiments of the present application, since the mapping between SSBs and PRACH occasions depends on several ceil operations, for example, for obtaining the amount of SSB groups etc., the calculated amount PRACH occasions may be more than required by the mapping. That is, for the number of PRACH repetitions, there may be one or more PRACH occasions without any mapped SSB in the last SSB group. Regarding that, one solution according to some embodiments of the present application is performing the mapping based on the actual amount of SSBs in the last SSB group until all SSBs are mapped and latter PRACH occasions are unused for this SSB group. The unused PRACH occasions can be further used by mapping for the next cycle. That is, in this solution, the amount of SSBs in each PRACH repetition in the last SSB group is not the same as the configured or predefined SSB group size. Another solution according to some embodiments of the present application is performing the mapping based on the configured or predefined SSB group size, and the PRACH occasion in each PRACH repetition without corresponding SSB in the last SSB group is unused. In this case, the unused PRACH occasions cannot be used by other mapping cycles.

Figure 6A:
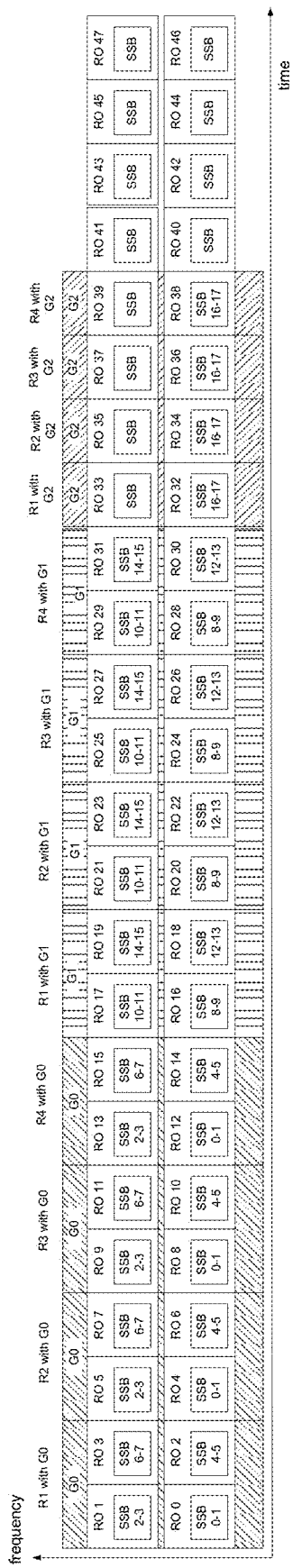
FIG. 6A and FIG. 6B respectively illustrate an exemplary mapping between SSBs and PRACH occasions according to some embodiments of the present application.
Figure 6B:
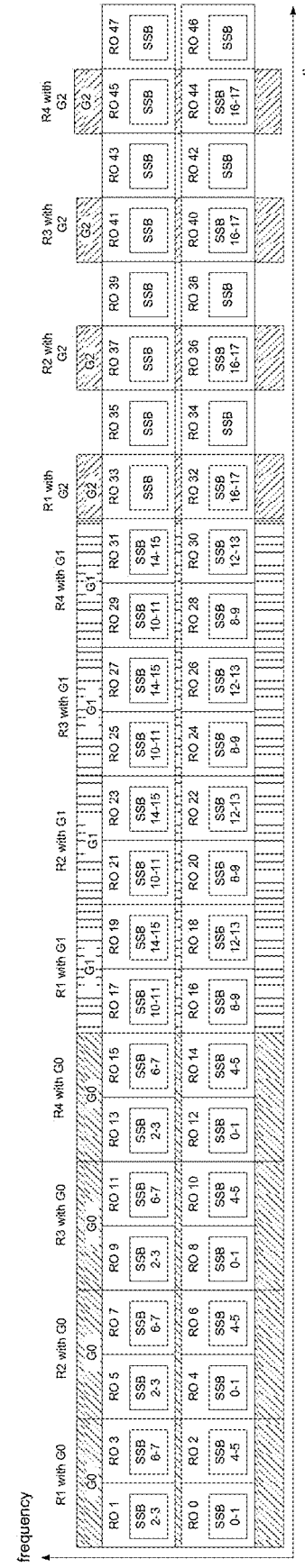

FIG. 6A and FIG. 6B respectively illustrate an exemplary mapping between SSBs and PRACH occasions according to some embodiments of the present application. Wherein, the difference between FIG. 6A and FIG. 6B lies in the mapping for the last SSB group due to redundant PRACH occasions.

In the exemplary embodiment shown in FIGS. 6A and 6B, SSB group size, i.e., "SSB-group-size" is 8. The amount of a plurality of SSBs to be mapped, i.e., "SSB-Total" is 18. "msg1-FDM" is 2 and "SSBPerRACHOccasion" is 2. The times of PRACH repetitions, i.e., "PRACH-repetition-times" is 4, each corresponding to R1, R2, R3 and R4. Then, the amount of SSB groups, "SSB-group-amount" is: SSB-group-amount=ceil (SSB-total/SSB-group-size)=ceil(18/8) =3. That is, there are 3 SSB groups, e.g., G0, G1 and G2. The amount of time domain PRACH occasions per SSB group, i.e., "time-RO-per-SSBgroup" is determined by: time-RO-per-SSBgroup=ceil (SSB-group-size/(msg1-FDM*ssb-per-RACH-Occasion))=ceil (8/(2*2))=2. That is, for each repetition for one SSB group, there are two time domain PRACH occasions. For example, for the first repetition with G0, i.e., R1 with G0, there are time domain PRACH occasions associated with RO 0 and RO 2; for the second repetition with G1, i.e., R2 with G1, there are time domain PRACH occasions associated with RO 20 and RO 22 in both FIGS. 6A and 6B. For the third repetition with G2, i.e., R3 with G2, there is time domain PRACH occasion associated with RO 36 in FIG. 6A, while there are time domain PRACH occasions associated with RO 40 and RO 42 in FIG. 6B. The amount of PRACH occasions per SSB group, i.e., "RO-per-SSBgroup" is calculated as: RO-per-SSBgroup=ceil (SSB-group-size/ssb-perRACH-Occasion) =ceil (8/2)=4. That is, for each repetition within one SSB group, there are 4 PRACH occasions. For example, for the first repetition with G0, there are RO 0, RO 1, RO 2, and RO 3 in the time and frequency domain (not considering code domain) (i.e., TRO 0 and TRO 1) in both FIGS. 6A and 6B. For the second repetition with G1, there are RO 20, RO 21, RO 22 and RO 23 in the time and frequency domain (not considering code domain) (i.e., TRO 10 and TRO 11); and for the third repetition with G2, there are RO 36 and RO 37 (unused) in the time and frequency domain (not considering code domain) in FIG. 6A (TRO 18), while there are RO 40, RO 41 (unused), RO 42 and RO 43 (unused) in the time and frequency domain (not considering code domain) in FIG. 6B (TRO 20 and TRO 21). The amount of the plurality of PRACH occasions for all the plurality of SSBs is calculated as: RO-total-amount=RO-per-SSBgroup*PRACH-repetition-times*SSB-group-amount=4*4*3=48. That is, for 4 times PRACH repetition, there are totally 48 PRACH occasions for the mapping of 18 SSBs, i.e., RO 0 to RO 47. The amount of the plurality of time domain PRACH occasions for all the plurality of SSBs is calculated as: time-RO-total-amount=time-RO-per-SSBgroup*PRACH-repetition-times*SSB-group-amount=2*4*3=24. That is, for 4 times PRACH repetition, there are totally 24 time domain PRACH occasions for the mapping of 18 SSBs in FIG. 6B, i.e., TRO 0, TRO 1, ... TRO 23, each TRO including two ROes in time and frequency domain with msg1-FDM configured as 2. However, due to the last SSB group, i.e., G3 using only one time domain PRACH occasion, for 4 times PRACH repetition, there are totally 20 time domain PRACH occasions for the mapping of 18 SSBs in FIG. 6A, i.e., TRO 0, TRO 1, ... TRO 19, each TRO for G0-G1 including two ROes in both time and frequency domain and each TRO for G3 including one used RO in both time and frequency domain (the other RO is unused).

However, as shown in FIGS. 6A and 6B, since there are only 18 SSBs for mapping, the counted 48 PRACH occasions are more than that required by the mapping. As shown in FIG. 6A, the mapping for the 4 PRACH repetitions is performed based on the actual amount of SSBs in the last SSB group in the same way as other SSB groups until all SSBs are mapped and latter PRACH occasions are unused. That is, in each PRACH repetition, only ROes in time domain corresponding to SSB 16 and SSB 17, i.e., RO 32, RO 34, RO 36 and RO 38 can be used, RO 33, RO 35, RO 37, RO 39 and ROes 40-48 are unused. While, in FIG. 6B, the mapping for the 4 PRACH repetitions is performed based on the configured or predefined SSB group size, i.e., 8 SSBs, and the PRACH occasion in each PRACH repetition without corresponding SSB in the last SSB group is unused. That is, in each PRACH repetition, two ROes in time domain besides the RO for SSB 16 and SSB 17 are supported while only one RO is used for the mapping, e.g., the first RO in time domain with each PRACH repetition. As shown in FIG. 6B, RO 32, RO 36, RO 40 and RO 44 can be used, ROes 33-35, 37-39, 41-43 and 45-47 are unused.

Figure 7:
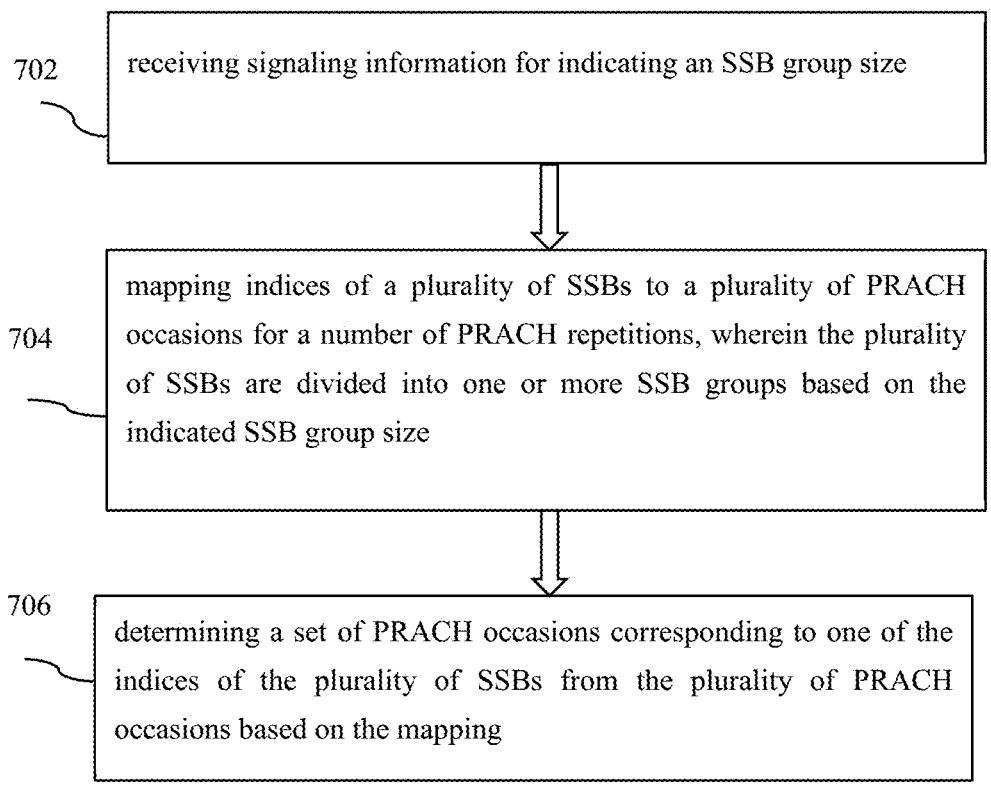
FIG. 7 illustrates an exemplary method for PRACH repetitions according to some embodiments of the present application.

FIG. 7 illustrates an exemplary method for PRACH repetitions according to some embodiments of the present application. The exemplary method can be performed in a UE. The UE may also be referred to as a subscriber unit, a mobile, a mobile station, a user, a terminal, a mobile terminal, a wireless terminal, a fixed terminal, a subscriber station, a user terminal, or a device, or described using other terminology used in the art.

Figure 8:
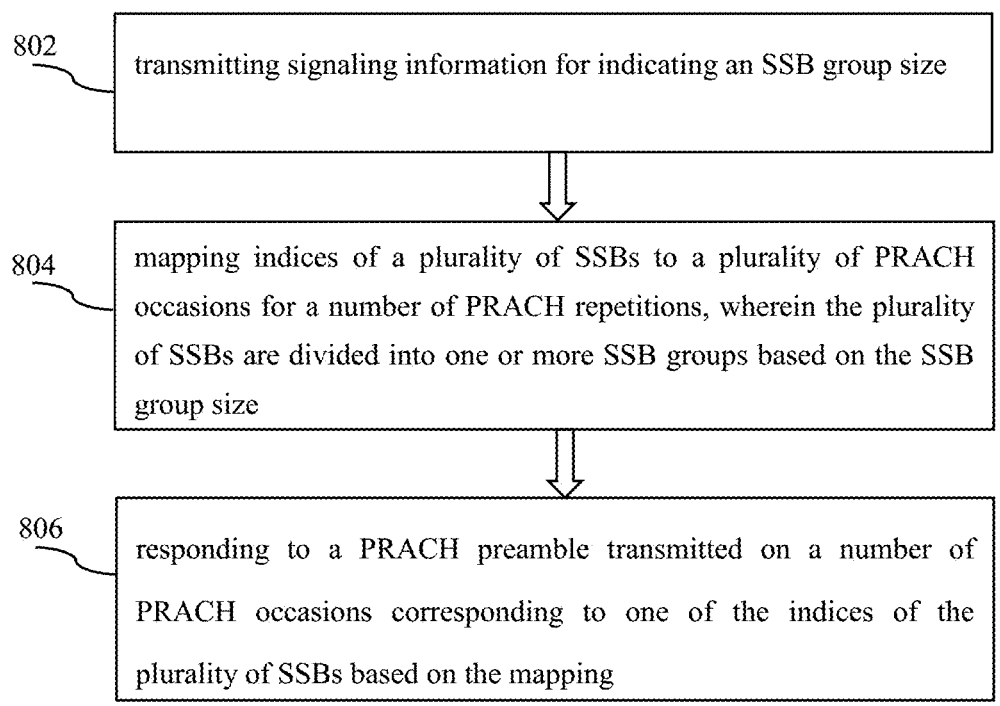
FIG. 8 illustrates another exemplary method for PRACH repetitions according to some other embodiments of the present application.

FIG. 8 illustrates another exemplary method for PRACH repetitions according to some other embodiments of the present application. The another exemplary method can be performed in a BS. The BS may be referred to as an access point, an access terminal, a base, a base unit, a macro cell, a Node-B, an evolved Node B (eNB), a gNB, a Home Node-B, a relay node, or a device, or described using other terminology used in the art. According to some embodiments of the present application, the method shown in FIG. 7 can cooperate with that shown in FIG. 8 in the system level; while they can also respectively cooperate with other methods according to some other embodiments of the present application.

The SSB group size for the mapping between a plurality of SSBs and a plurality of PRACH occasions for a number of PRACH repetitions can be configured or predefined. For example, in view of FIGS. 7 and 8, the SSB group size may be configured by the network side, e.g., a BS and be indicated to the remote side, e.g., a UE. For example, at step 802, signaling information for indicating an SSB group size can be transmitted, e.g., to the UE by the BS. At step 702, the signaling information for indicating an SSB group size can be received, e.g., from the BS by the UE.

In some embodiments of the present application, the signaling information may indicate the SSB group size in an explicit manner, e.g., indicating a value of the SSB group size. The value of the SSB group size is equal to or less than the total number of the plurality of SSBs. In some other embodiments of the present application, the signaling information may indicate the SSB group size in an implicit manner, e.g., indicating an amount of time domain PRACH occasions for each SSB group, or indicating an amount of time and frequency domain PRACH occasions for each SSB group. In some other embodiments of the present application, the signaling information may also implicitly indicate the SSB group size by indicating an amount of SSBs associated with one time domain PRACH occasion of the plurality of PRACH occasions for mapping, or by indicating an amount of SSBs associated with one time and frequency domain PRACH occasion of the plurality of PRACH occasions for mapping. The SSB group size can be calculated based on the associated signaling information.

For example, in the case that an amount of time domain PRACH occasions associated with an SSB group, e.g., time-RO-per-SSBgroup is indicated, the SSB group size can be calculated as: SSB-group-size=msg1-FDM*ssb-per-RACH-Occasion*time-RO-per-SSBgroup. In some embodiments of the present application, the signaling information may only indicate the amount of SSBs associated with one time domain PRACH occasion. Since msg1-FDM*ssb-per-RACH-Occasion is the amount of SSBs associated with one time domain PRACH occasion, this manner actually indicates that all SSBs within one SSB group are associated with the same time domain PRACH occasion. That is, time-RO-per-SSBgroup is implicitly indicated as 1. The SSB-group-size is actually implicitly indicated as the same as the amount of SSBs associated with one time domain PRACH occasion.

In addition to the above signaling information, the BS may configure other mapping parameters, e.g., the amount of the plurality of SSBs for the PRACH repetitions, "msg1-FDM" and "ssb-perRACH-OccasionAndCB-Preambles-PerSSB." According to some embodiments of the present application, the BS may also indicate a configured times of PRACH repetitions to the UE. The configured times of PRACH repetitions is at least one of cell-specific configured times, i.e., times configured for a specific cell (shared by all or a group of UEs in the cell) and UE-specific configured times, i.e., timed configured for a specific UE. The configured times of PRACH repetitions can be the same as or different from the actual times of PRACH repetitions, which can be determined by the UE itself. The cell-specific configured times and UE-specific configured times can be the same or different. That is, even if a plurality of UEs are within the same cell, they may have different actual repetition times.

According to some embodiments of the present application, the configured times of PRACH repetition can be indicated to the UE by at least one of frequency domain resource and code domain resource. For example, different frequency domain PRACH occasions are associated with different repetition numbers, and the frequency domain resource can be associated with frequency domain PRACH occasion index for different repetition times. Different PRACH preambles are associated with different repetition times, and the code domain resource can be associated with PRACH preamble index. In some embodiments of the present application, the indicated at least one of frequency domain resource and code domain resource can also be adaptive the scenario that the UE determines the times of PRACH repetitions by itself. In this case, a number of PRACH repetitions means a number of actual PRACH repetitions, and times of PRACH repetitions means times of actual PRACH repetition.

Based on the SSB group size, the UE and the BS can divide the plurality of SSBs into one or more SSB groups, and perform the mapping for the number of PRACH repetitions based on the SSB groups with other mapping parameters. At step 704, the UE can map indices of the plurality of SSBs to the plurality of PRACH occasions based on the divided SSB groups. Similarly, at step 804, the BS can map indices of the plurality of SSBs to the plurality of PRACH occasions based on the divided SSB groups. Specific mapping process has been illustrated in the above, and thus will not be described here in detail.

Based on the mapping between SSBs and PRACH occasions, at step 706, the UE can determine a set of PRACH occasions for a number of PRACH repetitions from the plurality of PRACH occasions based on the mapping at step 704, and the number of PRACH repetitions corresponds to one of the indices of the plurality of SSBs. The UE may transmit the same PRACH preamble corresponding to an SSB on the determined set of PRACH occasions to the network side. That is, the same PRACH preamble can be repeatedly transmitted to the network side. In step 806, the BS may make a response to the received PRACH preamble, which is transmitted on the number of PRACH occasions corresponding to one of the indices of the plurality of SSBs based on the mapping at step 704.

According to the above embodiments of the present application, all SSB groups are continuously repeated, that is each SSB group for a number of PRACH repetition is continuously distributed in time domain. In the other word, the number of PRACH repetition with the same SSB group are continuous. However, due to the mapping between SSBs and PRACH occasions according to embodiments of the present application is novel over the legacy technology, a legacy UE using legacy technology and a new UE using the novel technology have different understanding for performing the mapping with the same mapping parameters except the first PRACH repetition, e.g. R1 with the first SSB group, e.g., G0. "The first PRACH repetition with the first SSB group" means the first PRACH transmission with the first SSB group of one or more SSB groups for a number of PRACH repetitions. For example, both legacy UE and new UE transmit a PRACH preamble in the same time instance, while the BS, e.g., gNB can only receive the PRACH preamble either based on the legacy mapping between SSBs and PRACH occasions, or based on the new mapping between SSBs and PRACH occasions. That is, in any manner, one PRACH preamble from the legacy UE or from the new UE will be missed. Accordingly, the UE with missed PRACH preamble cannot access to the network and the BS cannot recognize the SSB or beam associated with the missed PRACH preamble. Thus, coexistence with NR legacy technology should be seriously considered.

According to some embodiments of the present application, a mechanism of PRACH repetition starting position cycle is introduced to ensure that both legacy UE and new UE have the same understanding for all the SSBs. Accordingly, the impact of misunderstanding between the legacy and new mapping technology can be balanced for legacy UEs and new UEs.

Under the mechanism of PRACH repetition starting position cycling, each mapping cycle starts from the first repetition with the first SSB group of one or more SSB groups for PRACH repetitions, while the first continuous distributed SSB group, which is mapped for a number of PRACH repetitions within each mapping cycle is different. That is, within a mapping cycle, an index of a first continuously distributed SSB group mapped for a number of PRACH repetitions is different. For example, an index of a first continuously distributed SSB group within a non-initial mapping cycle can increase in the order of SSB group index with respect to the previous mapping cycle of the non-initial mapping cycle. If the index of a first continuously distributed SSB group for a mapping cycle is the last SSB group index, then the index of a first continuously distributed SSB group for the next mapping cycle is the first SSB group index if the offset is 1 and it is the second SSB group index if the offset is 2, etc. A completed PRACH repetition starting position cycling period is defined that all the SSB groups for a number of PRACH repetitions have acted as the first continuous distributed SSB groups within a corresponding mapping cycle. The index of the first continuously distributed SSB group for a mapping cycle can be configured or predefined. The first continuously distributed SSB group index can be increased by a relative offset with respect to that of the previous mapping cycle. The relative offset with respect to that of a previous mapping cycle of the non-initial mapping cycle can an amount of time domain PRACH occasions per SSB group. In some embodiment of the present application, the relative offset with respect to that of a previous mapping cycle of the non-initial mapping cycle is an index step of the one or more SSB group.

Supposing that index for a previous mapping cycle is i_p, the offset is i_o, and the total number of SSB groups, i.e., "SSB-group-amount" is N, the index for current mapping cycle can be determined by a function, mod ((i_p+i_o), N). The starting position in time domain of the first mapping cycle (or initial mapping cycle) can be configured or predefined. The starting position in time domain of the first continuously distributed SSB group mapped within a non-initial mapping cycle can be increased by a relative offset with respect to that of the previous mapping cycle of the non-initial mapping cycle. According to some embodiments of the present application, the offset with respect to that of the previous mapping cycle of the non-initial mapping cycle is an amount of time-domain PRACH occasions within an SSB group, i.e., "time-RO-perSSBgroup" or multiples of "time-RO-perSSBgroup" The offset is relative due to comparing the two relative starting positions in time domain with respect to the start of the mapping cycle. For the remaining SSB groups needed to be mapped, which correspond to the remaining repetitions of the non-continuous PRACH repetitions, they will be moved to the end of the PRACH occasion in time domain in order of SSB group index within each mapping cycle.

FIG. 9A illustrates an exemplary mapping between SSBs and PRACH occasions under the mechanism of PRACH repetition starting position cycling according to some embodiments of the present application, which further includes FIG. 9A-1 corresponding to the first mapping cycle, FIG. 9A-2 corresponding to the second mapping cycle, and FIG. 9A-3 corresponding to the third mapping cycle. The mapping parameters and mapping principle in FIG. 9A are the same as those of FIG. 6A without considering cycling PRACH repetition starting position. There are 3 SSB groups, i.e., G0, G1, and G3; and each SSB group is for 4 PRACH repetitions, i.e., R1, R2, R3 and R4.

In the embodiment shown in FIG. 9A-1, in the first mapping cycle, the first continuously distributed SSB group mapped for a number of continuous PRACH repetitions, which is G0, and thus the starting position in time domain of the first continuously distributed SSB group in the first mapping cycle is the same as the starting position of the first mapping cycle, which can be configured or defined to be frame 0 or other position in time domain. Accordingly, in the first mapping cycle, the mapping pattern shown in FIG. 9A is substantially the same as that shown in FIG. 6A.

For the second mapping cycle shown in FIG. 9A-2, the index of the first continuously distributed SSB group mapped for a number of continuous PRACH repetitions increases in the order of SBB group index, i.e., the second SSB group G1. The starting position in time domain of the second mapping cycle corresponds to RO 40. The starting position in time domain of the first continuously distributed SSB group, i.e., G1 within the second mapping cycle can be increased by an offset with respect to that of the first continuously distributed SSB group in the first mapping cycle. The offset is an amount of time-domain PRACH occasions with one SSB group, i.e., 2 time domain PRACH occasions. Thus, the starting position in time domain of G1 can offset two time domain PRACH occasions in time domain relative to that of G0, i.e., RO 40. That is, the starting position in time domain of G1 corresponds to RO 44. For the remaining non-continuous PRACH repetitions corresponding to a specific SSB group, i.e., the second to fourth repetitions with the first SSB group, they will move to the end of the PRACH occasion sequence in time domain, i.e., after the PRACH occasions i.e., RO 66 for the last repetition with the third SSB group G2 (R4 with G2).

For the third mapping cycle shown in FIG. 9A-3, the index of the first continuously distributed SSB group mapped for a number of PRACH repetitions increases in the order of SSB group index, i.e., the third SSB group G2. The starting position in time domain of the third mapping cycle corresponds to RO 80. The starting position in time domain of G2 within the third mapping cycle can be increased by an offset with respect to that of the second SSB group G1. The offset is an amount of time-domain PRACH occasions within one SSB group, i.e., 2 time domain PRACH occasions. Thus, the starting position in time domain of G2 within the third mapping cycle can offset two time domain PRACH occasions relative to that of G1, i.e., RO 84. That is, the starting position in time domain of G2 corresponds to RO 88. For the remaining non-continuous PRACH repetitions corresponding to a specific SSB group, i.e., the second to fourth repetitions with the first and second SSB groups, they will move to the end of the PRACH occasion sequence in the order of SSB group index in time domain. Specifically, the second to fourth repetitions with the first SSB group, i.e., R2 with G0, R3 with G0 and R4 with G0 are after RO 94 in time domain for the last repetition with the third SSB group G2; and the second to fourth repetitions with the second SSB group, i.e., R2 with G1, R3 with G1 and R4 with G1 are after RO 106 in time domain for the last repetition with the first SSB group G0.

FIG. 9B illustrates an exemplary mapping between SSBs and PRACH occasions under the mechanism of PRACH repetition starting position cycle according to some other embodiments of the present application, which further includes FIG. 9B-1 corresponding to the first mapping cycle, FIG. 9B-2 corresponding to the second mapping cycle, and FIG. 9B-3 corresponding to the third mapping cycle. Similar to FIG. 9A, the mapping parameters and mapping principle in FIG. 9B are the same as those of FIG. 6A without considering cycling PRACH repetition starting position, while FIG. 9A and FIG. 9B have different first continuously distributed SSB group.

In the embodiment shown in FIG. 9B-1, the first continuously distributed SSB group in the first mapping cycle is configured or defined to be the second SSB group G1, and the first SSB group G0 is not for continuous repetitions. The starting position in time domain of the first mapping cycle can be configured or predefined to be frame 0 or other position in time domain. The starting position in time domain of the first continuously distributed SSB group, i.e., G1 can be frame 0 plus 2 time domain PRACH occasions based on the starting position in time domain of the first mapping cycle. The first repetition with the first SSB group G0, i.e., R1 with G0 occupies time domain PRACH occasions RO 0/1 and RO 2/3; and the remaining repetitions with the first SSB group G0, i.e., the second to fourth repetitions with the first SSB group G0 move to the end of the PRACH occasion sequence in time domain, i.e., after RO 26 in time domain for the last repetition with the third SSB group G2. The mapping pattern in FIG. 9B-1 is substantially the same as that shown in FIG. 9A-2.

For the second mapping cycle shown in FIG. 9B-2, the index of the first continuously distributed SSB group mapped for a number of PRACH repetitions increases in the order of SBB group index, i.e., the third SSB group G2. The starting position in time domain of the second mapping cycle is RO 40. The starting position in time domain of G2 within the second mapping cycle can be increased by an offset with respect to that of the second SSB group G1. The offset is an amount of time-domain PRACH occasions for one repetition with one SSB group, i.e., 2 time domain PRACH occasions. Thus, the starting position in time domain of G2 within the second mapping cycle can offset two time domain PRACH occasions relative to that of G1, i.e., RO 44. That is, the starting position in time domain of G2 corresponds to RO 48. For the remaining non-continuous PRACH repetitions respectively corresponding to a specific SSB group, i.e., the second to fourth repetitions with the first and second SSB groups, they will move to the end of the PRACH occasion sequence in time domain. Specifically, the second to fourth repetitions with the first SSB group, i.e., R2 with G0, R3 with G0 and R4 with G0 are after RO 54 in time domain for the last repetition with the third SSB group G2; and the second to fourth repetitions with the second SSB group, i.e., R2 with G1, R3 with G1 and R4 with G1 are after RO 66 in time domain for the last repetition with the first SSB group G0.

For the third mapping cycle shown in FIG. 9B-3, the index of the first SSB group mapped for a number of PRACH repetitions increases in the order of SBB group index in the PRACH repetition starting position cycle, i.e., returning to the first SSB group G0. Accordingly, the mapping pattern will be the substantially same as that shown in FIG. 6A and FIG. 9A-1.

Figure 10:
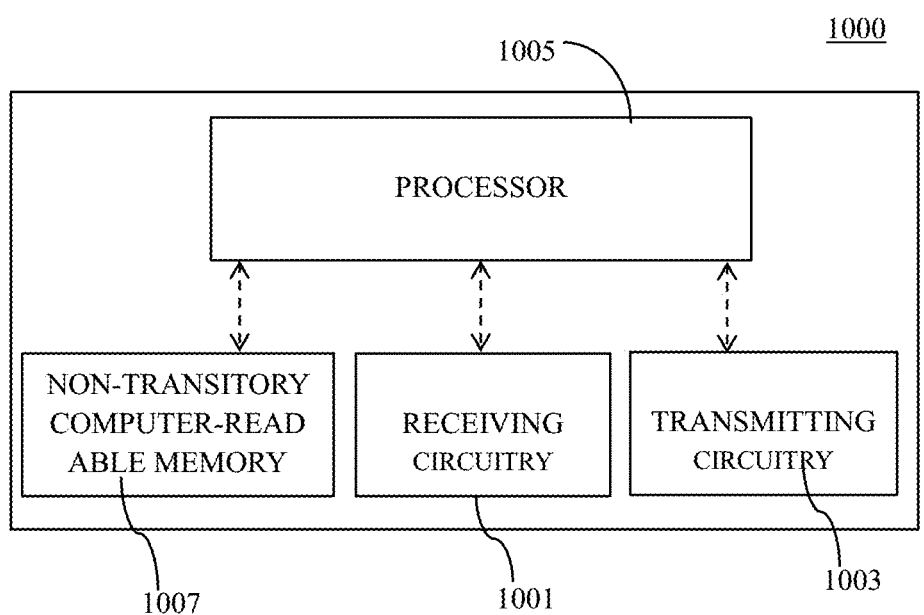
FIG. 10 illustrates a block diagram of an exemplary apparatus in accordance with some embodiments of the present application.

FIG. 10 illustrates a block diagram of an exemplary apparatus in accordance with some embodiments of the present application.

As shown in FIG. 10, the apparatus 1000 may include a receiving circuitry 1001, a transmitting circuitry 1003, a processor 1005, and a non-transitory computer-readable medium 1007. The non-transitory computer-readable medium 1007 has computer executable instructions stored therein to cause a processor to implement the method according to embodiments of the present application. The processor 1005 is configured to be coupled to the non-transitory computer readable medium 1007, the receiving circuitry 1001, and the transmitting circuitry 1003. It is contemplated that the apparatus 1000 may include more computer-readable mediums, receiving circuitry, transmitting circuitry and processors in some other embodiments of the present application according to practical requirements. In some embodiments of the present application, the receiving circuitry 1001 and the transmitting circuitry 1003 are integrated into a single device, such as a transceiver. In certain embodiments, the apparatus 1000 may further include an input device, a memory, and/or other components.

In some embodiments of the present application, the non-transitory computer-readable medium 1007 may have stored thereon computer-executable instructions to cause a processor to implement the operations with respect to UE(s) as described above, e.g., the method shown in FIG. 7, including: receiving signaling information for indicating an SSB group size; mapping indices of a plurality of SSBs to a plurality of PRACH occasions for a number of PRACH repetitions, wherein the plurality of SSBs are divided into one or more SSB groups based on the indicated SSB group size; and determining a set of PRACH occasions corresponding to one of the indices of the plurality of SSBs from the plurality of PRACH occasions based on the mapping.

In some other embodiments of the present application, the non-transitory computer-readable medium 1007 may have stored thereon computer-executable instructions to cause a processor to implement the operations performed in BS(s) as described above, e.g., the method shown in FIG. 8, including: transmitting signaling information for indicating an SSB group size; mapping indices of a plurality of SSBs to a plurality of PRACH occasions for a number of PRACH repetitions, wherein the plurality of SSBs are divided into one or more SSB groups based on the SSB group size; and responding to a PRACH preamble transmitted on a number of PRACH occasions corresponding to one of the indices of the plurality of SSBs based on the mapping.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:
    receiving signaling indicating a synchronization signal block (SSB) group size, wherein a plurality of SSBs are divided into one or more SSB groups based at least in part on the SSB group size;
    mapping, based at least in part on an order, indices of the plurality of SSBs to a plurality of physical random access channel (PRACH) occasions for a number of PRACH repetitions, wherein the order comprises:
        first, in increasing order of SSB indices within an SSB group;
        then, in increasing order of PRACH repetition indices; and
        then, in increasing order of SSB group indices; and
    determining a set of PRACH occasions corresponding to an index of the indices of the plurality of SSBs from the plurality of PRACH occasions based at least in part on the mapping.

2. The method according to claim 1, wherein the plurality of PRACH occasions are valid PRACH occasions.

3. The method according to claim 1, wherein the signaling indicates the SSB group size with a value.

4. The method according to claim 1, wherein the signaling implicitly indicates the SSB group size by indicating an amount of time domain PRACH occasions associated with respective SSB groups of the one or more SSB groups.

5. The method according to claim 1, wherein the signaling implicitly indicates the SSB group size by indicating an amount of time and frequency domain PRACH occasions associated with respective SSB groups of the one or more SSB groups.

6. The method according to claim 1, wherein the signaling implicitly indicates the SSB group size by indicating an amount of SSBs associated with one time domain PRACH occasion of the plurality of PRACH occasions.

7. The method according to claim 1, wherein the signaling implicitly indicates the SSB group size by indicating an amount of SSBs associated with one time and frequency domain PRACH occasion of the plurality of PRACH occasions.

8. The method according to claim 1, wherein the mapping is periodically performed, and wherein respective mapping cycles are associated with the number of PRACH repetitions.

9. The method according to claim 8, wherein the respective mapping cycles start from a configured or predefined time domain position, and wherein a duration of the respective mapping cycles is a smallest value that all the indices of the plurality of SSBs can be mapped to the plurality of PRACH occasions for the number of PRACH repetitions.

10. The method according to claim 8, wherein an index of a first mapped SSB group of the one or more SSB groups within a first mapping cycle of the respective mapping cycles is predefined or configured.

11. The method according to claim 10, wherein at least one of:
the index of the first mapped SSB group of the one or more SSB groups within the respective mapping cycles is a same value; or
an index of a first continuously mapped SSB group of the one or more SSB groups within a non-initial mapping cycle of the respective mapping cycles is increased by a relative offset with respect to that of a previous mapping cycle of the non-initial mapping cycle.

12. The method according to claim 11, wherein the relative offset with respect to that of the previous mapping cycle of the non-initial mapping cycle is at least one of an amount of time domain PRACH occasions per SSB group or an index step of the one or more SSB groups.

13. The method according to claim 1, further comprising receiving configured times of PRACH repetitions.

14. The method according to claim 13, wherein the configured times of the PRACH repetitions are at least one of cell-specific configured times or UE-specific configured times.

15. The method of claim 14, wherein the UE-specific configured times are indicated by at least one of frequency domain resource or code domain resource.

16. The method of claim 15, wherein the frequency domain resource is associated with a frequency domain PRACH occasion index, and wherein the code domain resource is associated with a PRACH preamble index.

17. The method according to claim 13, wherein the configured times of the PRACH repetitions are at least one of a same value as the number of PRACH repetitions or a different value from the number of PRACH repetitions.

18. A user equipment (UE) for wireless communication, comprising:
at least one memory; and
at least one processor coupled with the at least one memory and configured to cause the UE to:
receive signaling indicating a synchronization signal block (SSB) group size, wherein a plurality of SSBs are divided into one or more SSB groups based at least in part on the SSB group size;
map, based at least in part on an order, indices of the plurality of SSBs to a plurality of physical random access channel (PRACH) occasions for a number of PRACH repetitions, wherein the order comprises:
first, in increasing order of SSB indices within an SSB group;
then, in increasing order of PRACH repetition indices; and
then, in increasing order of SSB group indices; and
determine a set of PRACH occasions corresponding to an index of the indices of the plurality of SSBs from the plurality of PRACH occasions based at least in part on the mapping.

19. A network equipment (NE) for wireless communication, comprising:
at least one memory; and
at least one processor coupled with the at least one memory and configured to cause the NE to:
transmit signaling indicating a synchronization signal block (SSB) group size, wherein a plurality of SSBs are divided into one or more SSB groups based at least in part on the SSB group size;
map, based at least in part on an order, indices of the plurality of SSBs to a plurality of physical random access channel (PRACH) occasions for a number of PRACH repetitions, wherein the order comprises:
first, in increasing order of SSB indices within an SSB group;
then, in increasing order of PRACH repetition indices; and
then, in increasing order of SSB group indices; and
respond to a PRACH preamble transmitted on a number of PRACH occasions corresponding to an index of the indices of the plurality of SSBs based at least in part on the mapping.

20. A processor for wireless communication, comprising:
at least one controller coupled with at least one memory and configured to cause the processor to:
receive signaling indicating a synchronization signal block (SSB) group size, wherein a plurality of SSBs are divided into one or more SSB groups based at least in part on the SSB group size;
map, based at least in part on an order, indices of the plurality of SSBs to a plurality of physical random access channel (PRACH) occasions for a number of PRACH repetitions, wherein the order comprises:
first, in increasing order of SSB indices within an SSB group;
then, in increasing order of PRACH repetition indices; and
then, in increasing order of SSB group indices; and
determine a set of PRACH occasions corresponding to an index of the indices of the plurality of SSBs from the plurality of PRACH occasions based at least in part on the mapping.

* * * * *